Feb. 3, 1970 W. T. MONAGHAN ET AL 3,492,821
THRUST REVERSING MEANS FOR A GAS TURBINE BYPASS ENGINE
Filed June 14, 1968 2 Sheets-Sheet 1

Inventors
WILLIAM THOMAS MONAGHAN
LEONARD JOHN RODGERS
By
Cushman, Darby & Cushman
Attorneys

United States Patent Office 3,492,821
Patented Feb. 3, 1970

3,492,821
THRUST REVERSING MEANS FOR A GAS
TURBINE BYPASS ENGINE
William Thomas Monaghan, Nottingham, and Leonard
John Rodgers, Spondon, Derby, England, assignors
to Rolls-Royce Limited, Derby, England, a British
company
Filed June 14, 1968, Ser. No. 737,169
Claims priority, application Great Britain, July 1, 1967,
30,458/67
Int. Cl. F02k 1/20; B64c 15/06
U.S. Cl. 60—229
3 Claims

ABSTRACT OF THE DISCLOSURE

A gas turbine jet propulsion bypass engine is provided with common thrust reversing means for reversing both the bypass air and exhaust gases. The means comprises two scoop members each having a pair of stub wings which project across the bypass passage. The scoops pivot about a common axis and their upstream profiles in conjunction with the upstream profiles of the stub wings, are such that when the scoops are pivoted to a flow reversing position, said profiles substantially conform to the profile of the bypass passage, so blocking both the jet pipe and bypass passage flows. The downstream ends of the bypass passage outer wall and jet pipe are adapted to move axially, in unison, to provide radial gaps for the flow of reversed gas and air therethrough.

---

This invention concerns thrust reversers for jet engines.

According to the present invention there is provided thrust reversing apparatus for a gas turbine jet propulsion bypass engine comprising two diametrically opposed scoop shaped members mounted for pivotal movement about a common axis transverse to the engine axis, and forming in an inoperative position, a part of the engine jet pipe wall, each member having a wing on each of its outer sides, the unattached edge of each wing which is presented to the engine bypass air flow being curved and the remaining free edge being straight, the profile thus defined by the wings and members at the upstream end thereof causing substantially no blockage to the flow of gases and bypass air when in said inoperative position and a substantially complete blockage to said flows, when in an operative position, the downstream ends of the jet pipe and bypass passage being connected and adapted to move in a downstream direction to open a radial gap therein so as to provide an outlet for said gases and air when the jet pipe and bypass passage are blocked, means being provided whereby the members and the downstream ends of the jet pipe and bypass passage are caused to move simultaneously, actuating means being provided to initiate said movement.

The actuating means may comprise rams or ball screw and nut mechanisms, powered electrically, hydraulically or pneumatically.

The invention will now be described, by way of example only and with reference to the accompanying drawings in which.

Figure 1:
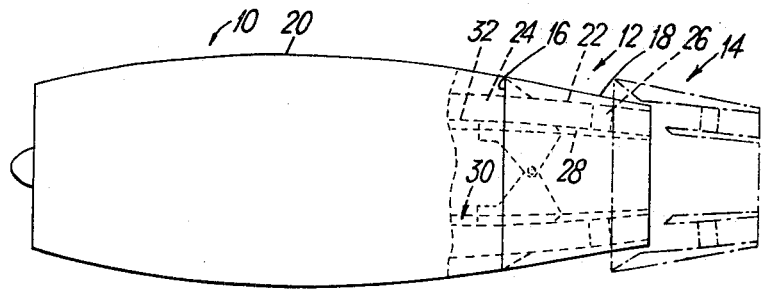
FIGURE 1 is a diagrammatic view of a gas turbine bypass engine.

In FIGURE 1 a gas turbine jet propulsion bypass engine 10 is provided at its downstream end 12 with an axially translatable portion 14.

Engine 10 and portion 14 are divided at line 16 on a vertical plane transverse to the engine axis.

Portion 15 comprises the downstream end 18 of engine pod 20, the outer wall 22 of bypass passage 24, a plurality of struts 26 and a portion 28 which forms the downstream inner wall of passage 24 and the downstream part of jet pipe 30. Portions 14 and 28 are connected by struts 26 which extend radially from one to the other.

Upstream portion 32 of jet pipe 30 is axially spaced from portion 28 by two diametrically opposed scoop shaped members 34–36. These are seen more clearly in FIGURE 2. Members 34–36 are mounted for rotation about a common axis 38 which passes through the engine axis and is transverse thereto.

In a non-operative position, the upstream ends of members 34–36 abut the downstream end of jet pipe portion 32, and the downstream ends of members 34–36 abut the upstream end of portion 28, thus forming a continuous conduit through which exhaust gases may flow unimpeded to atmosphere through nozzle 37.

In the same position, the upstream face 40 of downstream portion 18 abuts a conical wall 42 which joins pod 20 and the outer wall of by-passage 24 and thus provides an unbroken passage for the flow of bypass air to atmosphere through annular nozzle 44.

A plurality of rams 46, or the like are mounted within an annular space 48. These rams are positioned equi-angularly around space 48 and may be anchored to either the bypass passage outer wall, or to the inner wall of pod 20.

The rams may be actuated hydraulically, pneumatically or electrically. Furthermore, ball screw and nut mechanisms may be used instead of the rams.

Rods 50 protrude in known manner from ram cylinder 52, and are slidably supported by plain bearing structure 54 fixed to wall 42. The downstream ends of rods 50 are attached to face 40 of portion 18 so that when rams 46 are actuated so as to move rods 50 in a downstream direction, portion 18 will also move in a downstream direction. Since portion 18 is rigidly connected to portion 28 by struts 26, portion 28 will also move downstream. Thus two radial gaps 56–58 will be opened, one in the bypass passage 24 and one in the jet pipe 30 respectively.

Members 34–36 are connected by links 60, of which one only is shown, to bypass passage outer wall 22. The joints at each end of these links, are of the pivotal type.

When downstream portion 14 moves in a downstream direction, links 60 will pull on their respective members 34–36, causing them to pivot about axis 38 and to continue pivoting until the downstream edges 34a–36a meet on the engine axis.

The meeting will coincide with rams 46 reaching their desired extension and the system will be held in this condition for as long as required.

Figure 3:
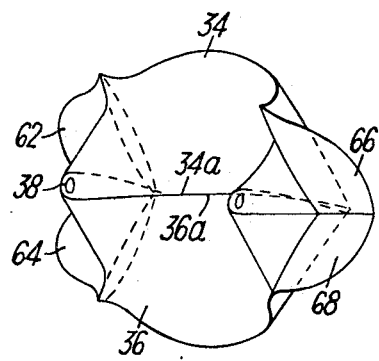
FIGURE 3 is a pictorial view of the thrust reverser.
Figure 4:
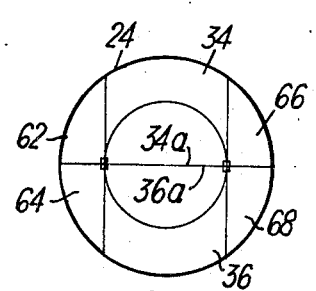
FIGURE 4 is a view on line 4—4 of FIGURE 2.
Figure 2:
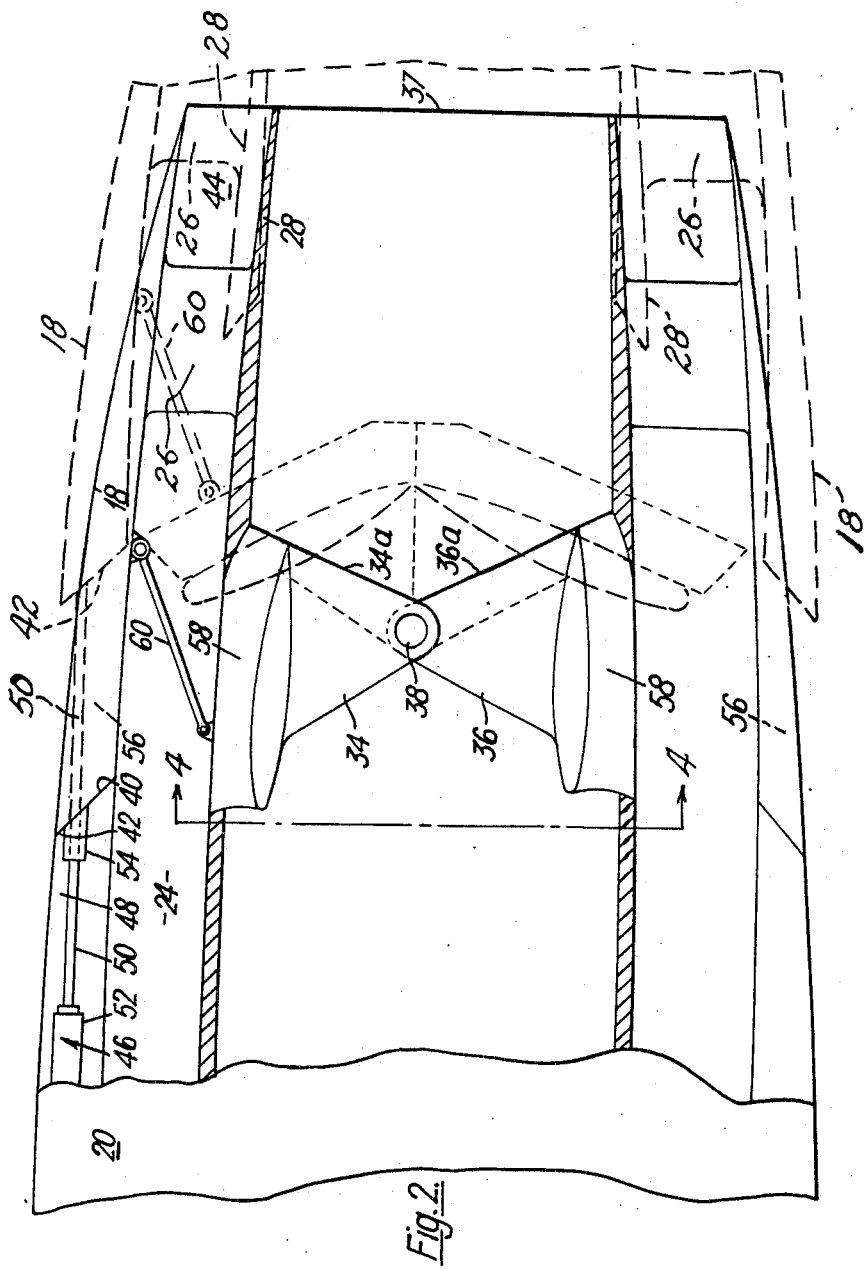
FIGURE 2 is an enlarged part sectional view of the down-stream end of the engine.

When edges 34a–36a meet, members 34–36 will be in the positions indicated by dotted lines in FIGURE 2 and full lines in FIGURES 3 and 4. Thus the gas and air flows will be prevented from passing to atmosphere through nozzles 37–44 respectively. Instead, said gas and air will be directed substantially radially outwards by members 34–36 and then forwards, in an upstream direction by conical wall 40, thereby providing reverse thrust.

It will be appreciated by those skilled in the art that as members 34–36 when in their inoperative positions form part of jet pipe 30, and this pipe is of smaller diameter than the outer wall 22 of bypass passage 24, the transverse profile of members 34–36 when pivotally opened as in FIGURES 3 and 4 cannot fully conform to the transverse profile of outer wall 22. Therefore, each member has two transversly opposed wings rigidly attached to it. These wings are designated 62–64–66 and 68.

The wings are aerofoil shaped in axial cross-section so as to reduce drag on the bypass air when the apparatus is in its inoperative position, and have their longer edges curved so as to conform more closely with the outer wall 22 when the apparatus is in its operative position. It will be seen, therefore, that all of the exhaust gases and substantially all of the bypass air will be prevented from flowing through their respective conduits to atmosphere.

If required, a cascade structure comprising a plurality of axially spaced aerofoil section vanes (not shown) may be fitted in known manner within radial gap 56 so as to assist in causing the deflected gas and air to flow in an upstream direction. The cascade may be arranged to nest within the downstream portion 18 when not in use and to be exposed when reverse thrust is required.

We claim:

1. A gas turbine jet propulsion bypass engine having a jet pipe and a coaxial outer wall which forms an annular bypass passage and provided with thrust reversing apparatus, which apparatus is pivotally mounted to the jet pipe and in an inoperative position, forms a part of the wall thereof, the apparatus comprising two scoop shaped members positioned diametrically opposite each other, each member having two oppositely positioned aerofoil shaped wings on its outer side, which wings project into the bypass passage in a substantially non-obstructional manner in said inoperative position, and wherein the scoop shaped members are adapted to pivot to an operative position and the upstream profiles of the scoop shaped members are so formed that when said scoop shaped members are in said operative position, said profiles are adjacent to and conform substantially with, the inner surface of the bypass and outer wall, so blocking and reversing substantially all of the engine gas flow and bypass passage air flow.

2. An engine as claimed in claim 1 wherein the downstream portions of the bypass passage outer wall and jet pipe are adapted to simultaneously move axially and wherein connecting links connect said outer wall with the scoop shaped members, so as to cause simultaneous pivoting thereof to or from the operative position, and wherein when said axial movement of the bypass passage outer wall and jet pipe is in a downstream direction, radial gaps are opened therein for the passage of reversed hot gas and air therethrough, to atmosphere.

3. An engine as claimed in claim 1 wherein actuating means are provided whereby to effect said simultaneous axial movement of the downstream portions of the bypass passage outer wall and jet pipe, said actuating means comprising pneumatic rams located on the outer surface of the upstream portions of the bypass passage outer wall and connected by their downstream, movable ends to the downstream portion of the bypass passage outer wall.

References Cited
UNITED STATES PATENTS

| | | | |
|---|---|---|---|
| 3,024,601 | 3/1962 | Nash | 60—229 XR |
| 3,434,666 | 3/1969 | Shaw | 239—265.31 XR |

MARK M. NEWMAN, Primary Examiner

A. D. HERMANN, Assistant Examiner

U.S. Cl. X.R.

60—262; 239—265.29, 265.31